United States Patent

[11] 3,576,538

| [72] | Inventor | Robert P. Miller<br>Spring Valley, N.Y. |
|---|---|---|
| [21] | Appl. No. | 815,978 |
| [22] | Filed | Apr. 14, 1969 |
| [45] | Patented | Apr. 27, 1971 |
| [73] | Assignee | Identimation Corporation<br>Northvale, N.J.<br>Continuation-in-part of application Ser. No. 728,252, May 10, 1968, now abandoned. |

[54] FINGER DIMENSION COMPARISON IDENTIFICATION SYSTEM
28 Claims, 11 Drawing Figs.

[52] U.S. Cl. ..................... 340/149,
340/146.3, 250/219
[51] Int. Cl. ..................... H04q 3/00
[50] Field of Search ..................... 340/149,
149 (A), 146.3; 235/617; 179/2

[56] References Cited
UNITED STATES PATENTS

| 2,899,857 | 8/1959 | Rockafellow | 340/149A |
| 2,914,746 | 11/1959 | James | 340/149A |
| 2,977,024 | 3/1961 | Harris | 235/61.7(b) |

*Primary Examiner*—John W. Caldwell
*Assistant Examiner*—Howard S. Cohen
*Attorney*—Pennie, Edmonds, Morton, Taylor & Adams ABSTRACT: An identification system comprising a sensing device for sensing an outer dimension of an individual's fingers, a comparison mechanism for comparing the information regarding the outer dimension of an individual's fingers as sensed by the sensing device with the same information of an individual's fingers as precalculated, and an indicator for indicating an identity or lack of identity between the sensed information of the individual's fingers with the precalculated information.

PATENTED APR 27 1971

*INVENTOR.*
Robert P. Miller
BY *Pennie, Edmonds,
Morton, Taylor and Adams*
ATTORNEYS

INVENTOR.
Robert P. Miller
BY Pennie, Edmonds,
Morton, Taylor and Adams
ATTORNEYS

FINGER DIMENSION COMPARISON IDENTIFICATION SYSTEM

RELATED APPLICATIONS

The present application is a continuation-in-part of application Ser. No. 728,242 entitled "Identification System" filed May 10, 1968 by Robert P. Miller, now abandoned.

BACKGROUND OF THE INVENTION

1. Field of the Invention

The present invention pertains to an identification system for identifying individuals by use of prerecorded information. More particularly, the invention relates to an identification system in which an identification card containing certain prerecorded information regarding the outer dimension of an individual's fingers is issued to the individual and compared with the actual dimension of the individual's fingers at the time the identification is to be made.

2. Description of the Prior Art

Under certain circumstances, it is desired to distinguish individuals from each other by means other than personal recognition. For this purpose, the individuals to be identified may be issued personal identification cards with each card containing pertinent information relative to the individual to whom it is issued. These cards vary in complexity depending on the purpose for which they are to serve. In some situations, they merely contain an identification number and the individual's signature; and an identification of the individual using the card is made by comparing the individual's signature as contained on the card with the signature written by the individual at the time the identification is being made.

Where a more positive and reliable identification of an individual is required, the identification card may not only contain the individual's signature but also his photograph and a representation of his fingerprints or other information pertinent to the individual. A more reliable identification of individuals through use of identification cards may, for example, be desired to control access to restricted areas such as government installations, or other places such as factories, apartment buildings, banks and the like. Also, a reliable identification of individuals would be necessary where the identification card is used as a credit card and authorized use is of primary importance. The more complex the card is, the more complicated becomes the mechanism for comparing the information on the card with the same information as derived from the individual using the card at the time the identification is made; and with some types of identification cards presently available, it is not too difficult for an individual to forge a card which will meet the requirements imposed by the system in which it is designed to be used.

SUMMARY OF THE INVENTION

In accordance with the teachings of the present invention, an identification system is provided in which problems of reliability and complexity encountered with conventional systems are substantially avoided. Generally, the present system avoids the necessity of any personal recognition of the individual being identified. At the time an identification of an individual is to be made, a pattern defined by certain dimensions of a plurality of his fingers is determined. The information as defined by this pattern is then compared with the same information as defined by a similar pattern which has been precalculated and stored or fed into the system.

The precalculated information of the particular dimensions of the individual's fingers which are to be determined at the time the identification is being made may be included on an identification card previously issued to the individual or on any other means suitable for recording data and issued to the individual or stored in the system. As presently preferred, the precalculated information is contained on an identification card suitable for fitting into the individual's wallet. If, at the time the identification is being made, the information as defined by the two patterns is the same, this will indicate that the person using the particular identification card is the person to whom it was issued. If, however, the two patterns do not compare properly, this will indicate that the card is being used by an unauthorized person.

In the present system as described above, the identification card issued to the individual contains identifying means in the form of transparent portions positioned on the card to define a pattern representing the relative lengths of a plurality of an individual's fingers. When an identification of an individual in possession of the card is made, such individual first places the card in a predetermined position relative to a photoelectric sensing device by which the light permitted to pass through the transparent portions of the card is measured. The individual then places his hand in a position where the relative lengths of his fingers are sensed. This finger sensing means is connected to a second set of identification means comprising opaque members. As the lengths of the individual's fingers are sensed, these opaque members are moved along a path in which they will completely cover the transparent portions of the identifying means on the identification card only if the individual whose finger lengths are being sensed is the individual to whom the card was issued. An identity between the two patterns represented by the two identifying means is determined by the photoelectric sensing means which senses the absence or presence of light passing through the card once the opaque members of the finger identifying means have been moved into their final position in accordance with the lengths of the individual's fingers. If the opaque portions of the finger identifying means overlie the transparent portions of the identification card, the photoelectric means upon sensing this condition as an absence of light will automatically trigger an indicator to show that a proper identification has been made. If, on the other hand, the photoelectric means senses light after the opaque portions have been moved into their final position, this will trigger the indicator to show a lack of identity between the person being identified and the person to whom the identification card was issued.

With the identification system constructed in accordance with the teachings of the present invention, groups of individuals to whom identification cards are issued may be automatically and quickly identified at a later date by simply measuring the lengths of an individual's fingers. Also, to deter unauthorized manufacture of the identification cards, the pattern placed on the card of each individual may be coded. For example, the transparent portions representing the pattern defined by the ends of the individual's fingers may be spaced at distances relative to each other which are at some predetermined linear or nonlinear ratio relative to the actual spacing between the ends of the individual's fingers. Further, to deter improper use of the identifying mechanism while an identification is being made, sensing and indicating mechanisms are provided to assure that a proper type of identification card is used and that the individual properly inserts his hand into the sensing position.

DESCRIPTION OF THE PREFERRED EMBODIMENT

Figure 1:
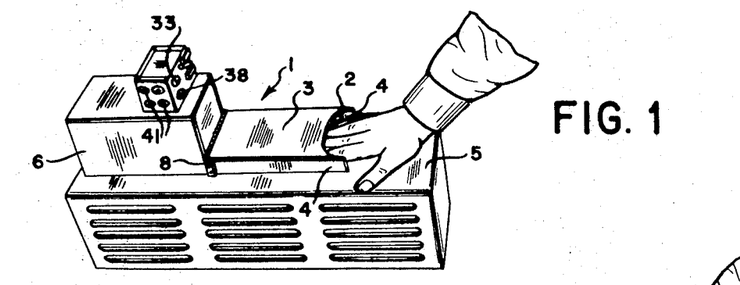
FIG. 1 is a side perspective view of the identifying apparatus of the present invention.

As shown in the drawings, the apparatus employed in the identification system of the present invention includes a framework defining a walled housing 1 within which various sensing and comparing mechanisms are positioned. As shown in FIG. 1, the housing includes an opening 2 for receiving four fingers of the individual to be identified. This opening is defined by the cover portion 3 of the housing, side members 4 and the upper surface 5 of the lower enlarged section of the housing. The surface 5 supports the individual's hand as he inserts his fingers into the opening 2. Also positioned on the surface 5 of the housing is a section 6 of the housing having at the back thereof an opening 7 (FIG. 4) for receiving an identification card. Both the cover 3 and housing section 6 are hinged to the enlarged section of the housing as shown at 8 to provide access to the interiorly disposed mechanisms. Suitable locking mechanism, not shown, is advantageously provided for locking the cover 3 and housing section 6 in the closed position shown in FIG. 1 so that unauthorized entry into the interior of the housing during use of the apparatus is prevented. Positioned within the openings 2 and 7 are sensing mechanisms for sensing the outer dimension of the individual's fingers and comparing this information with related information on the identification card to determine its identity or lack of identity; and thus, whether the person being identified is the one to whom the identification card was originally issued.

Figure 2:
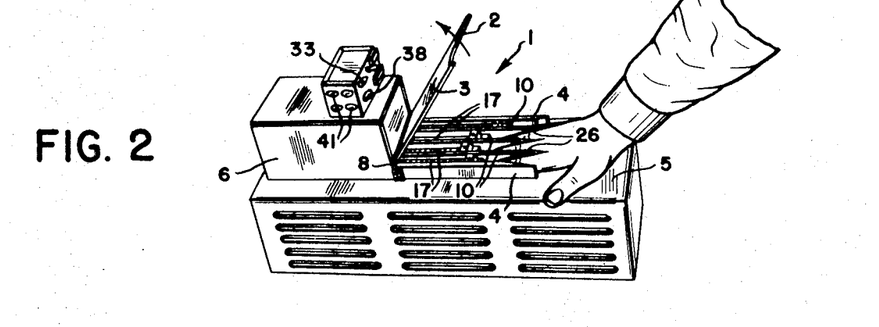
FIG. 2 is a perspective view similar to FIG. 1 with a portion of the housing shown in open position.
Figure 3:
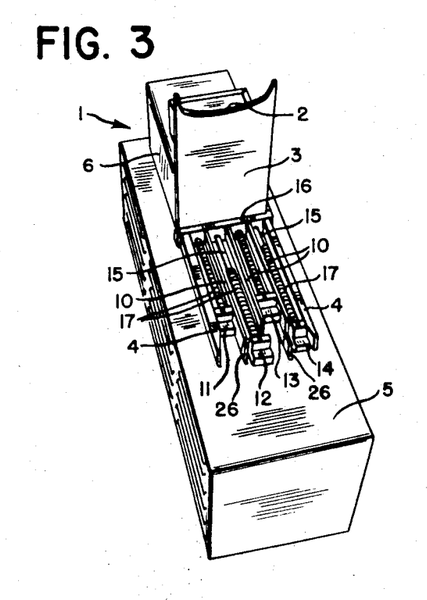
FIG. 3 is a front perspective view of the apparatus of FIG. 1 showing the finger sensing mechanism.

Referring to FIGS. 2 and 3, it will be seen that the side members 4 together with the intermediate members 10 define guides for aligning the four fingers of the individual within the opening 2. Positioned between these guides are finger sensing means. These sensing means may be electrical, optical or mechanical type sensors; and in the presently preferred construction they include mechanical contact members 11, 12, 13 and 14. These contact members face outwardly of the opening 2 and are connected to the ends of the pushrods 15. The pushrods, in turn, extend slidably through a rod support member 16; and springs 17 surround each of the pushrods between the contact members 11—14 and support member 16 for normally urging the contact members outwardly of the opening 2. In FIG. 3, the contact members 12 and 14 are displaced from their normal inactive position to more clearly show the relationship between the rods 15 and surrounding springs 17. Normally, when not in use, each of the contact members 11—14 will be disposed within the boundaries defined by the guides 4 and 10 and thus within the housing structure. To maintain this position, the springs 17 are secured at their ends to the contact members and rod support member.

Figure 4:
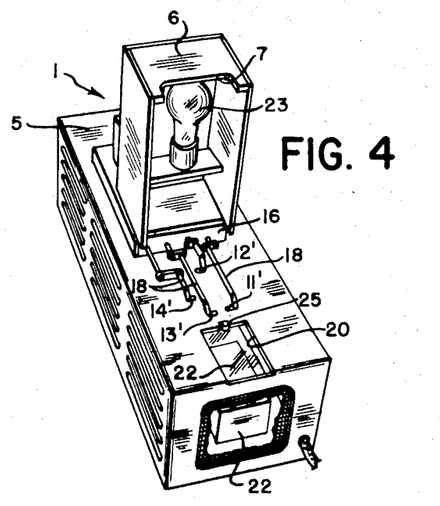
FIG. 4 is a rear perspective view of the apparatus of FIG. 1 with a portion of the housing raised to show the interior card sensing and comparing mechanism.
Figure 5:
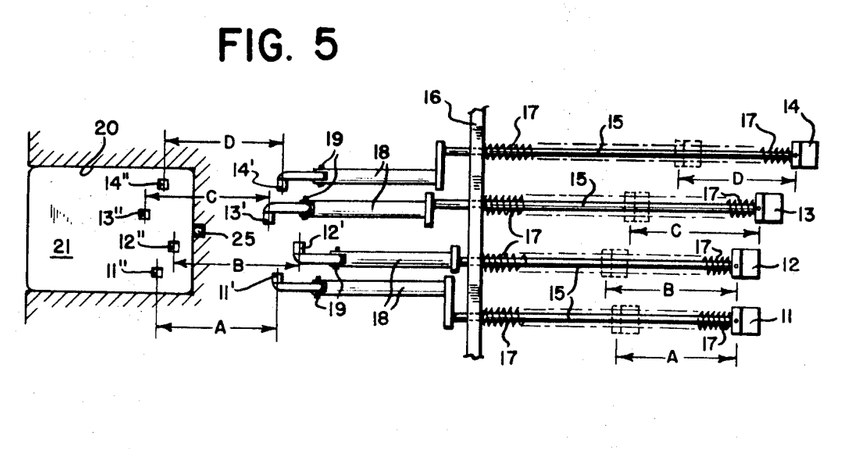
FIG. 5 is a schematic view of certain portions of the identifying mechanism of the present invention.

The rear ends of each of the pushrods 15 are provided with identifying means in the form of mask members 11′, 12′, 13′ and 14′, connected thereto by way of linkages 18. It will be noted from FIGS. 4 and 5 that the masks 11′—14′ are laterally offset from their associated contact members 11—14. This lateral offsetting permits the use of a small identification card having a size such as that of a typical credit card. Also, as seen in FIG. 5, the masks 11′—14′ are each pivotally connected at 19 for movement about a horizontal axis so that each mask will slide along the upper surface 5 of the housing. For receiving the identification card used with the identification system of the present invention, the upper surface 5 of the housing is provided with a recess 20 having a width and depth corresponding to the width and thickness of the card. This recess is aligned with the opening 7 and located within the path of axial movement of the masks 11′—14′.

Figure 6:
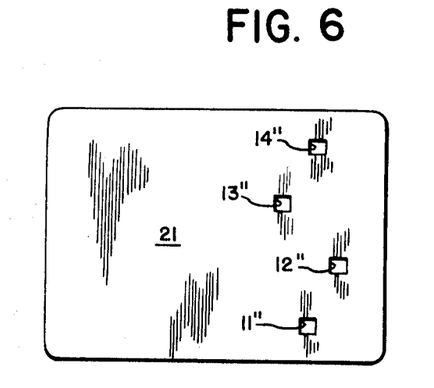
FIG. 6 is a plan view of the identification card used in the identification system of the present invention.

The identification card 21, as shown in FIG. 6, is constructed of opaque material and provided with series of transparent portions 11″, 12″, 13″ and 14″ defining the identifying means of the individual to whom the card is issued. These transparent portions 11″—14″ define a pattern which is related to the lengths of the individual's fingers, and which is to be compared with the pattern defined by the masks 11′—14′ when the latter have been moved into a comparing position upon insertion of the individual's fingers into the opening 2 of the housing.

To determine the particular positions of the transparent portions 11″—14″ on the identification card, the relative location of the ends of the individual's fingers is first calculated. Using four fingers, this will provide a pattern defined by a series of four identifying points spaced from each other in a direction measured along the lengths of the individual's fingers. These points are then used for determining the location of the transparent portions 11″—14″ on the identification card. However, instead of maintaining a direct relationship between the four identifying points formed by the individual's fingers and four transparent portions 11″—14″ on the card, the information represented by the identifying points is coded before being carried over onto the card. By use of such coding, an examination of the card will not readily show the true information represented by the pattern defined by the transparent portions 11″—14″.

In the embodiment of the card shown in FIG. 6, the coding of the transparent portions 11″—14″ is effected by first adding and subtracting predetermined different increments to the four identifying points as measured along the length of the individual's fingers. Thus, with the transparent portion 11″ representing the positioning of the end of the index finger of the individual's right hand when pointing to the left in FIG. 6, the laterally adjacent transparent portion 12″ represents the positioning of the end of the next adjacent finger of the individual. It is apparent from an examination of FIG. 6, however, that the distance between the transparent portions 11″ and 12″ as measured along the length of the card does not correspond to the actual difference in length between the two fingers of the individual represented thereby. Instead, a predetermined increment has first been subtracted from the actual longitudinal spacing between the ends of the individual's fingers so that the spacing between these two portions 11″ and 12″ is in the reverse direction from the actual direction of the spacing of the ends of the corresponding fingers of the individual. In a similar way, the spacing of the transparent portions 13″ and 14″ along the length of the card is determined to thereby produce an identifying pattern which is completely coded.

In order that this coded pattern will be properly read when an individual attempts to identify himself by placing his card within the opening 7 of the identifying apparatus and his hand within the opening 2 thereof, the axial spacing of the mask members 11′—14′ is prearranged such that when the identifying mechanism is in its normal unactuated position as shown in FIG. 5, these masks will be related axially to each other with the same coding as employed in determining the pattern of the transparent portions 11″—14″. Thus, where an individual being identified uses an identification card properly issued to him, insertion of his fingers into the identifying apparatus will cause a predetermined movement of the contact members 11—14 from their normal, at rest position. With reference to FIG. 5, the contact member 11 will move through a distance A while the contact members 12, 13 and 14 will move through distances B, C and D, respectively. This, in turn, will cause the masks 11′—14′ to move through the same distances A—D and form a pattern identical to and overlying the pattern defined by the transparent portions 11″—14″ on the identification card.

In order to sense this identity between the two patterns, the identifying apparatus is provided with a comparing means in the form of a photoelectric-sensing device for comparing the pattern on the identification card with the pattern defined by the mask members. As shown in FIG. 4, the base of the recess 20 on which the identification card is to be positioned is constructed of transparent material. Positioned beneath this recess is a photoelectric-sensing device 22, while a light source 23 overlies the recess 20 when the housing section 6 is locked in its closed position. This sensing mechanisms includes four light sensors 24 adapted to take a reading of the presence or absence of light passing through each of the transparent portions of the identification card. With the construction of the apparatus as described above, an absence of light will indicate an identity between the two patterns and, as more fully described below, such a reading will cause actuation of an indicator or control mechanism to which the identifying apparatus is connected to indicate that the individual being identified is the one to whom the identification card was issued. If, on the other hand, an unauthorized use of the card is being made, the masks 11′—14′ will not form a pattern identical to and overlying the pattern defined by the transparent portions 11″—14″ on the identification card and a presence of light will therefore be sensed by the photoelectric-sensing device actuating an indicator to show a lack of identity.

In order to prevent a person from using an identification card on which he has covered the transparent portions and which would thereby normally cause the photoelectric-sensing mechanism to read an absence of light and indicate an identity, a card sensing mechanism is provided. As shown in FIG. 4, the front end of the recess 20 is provided with a contact member 25 against which the front end of the identification card engages upon full insertion into the recess. As more fully described below, engagement of this contact by the card will actuate the sensing mechanism of the identifying apparatus to initially indicate the presence or absence of a valid identification card. Also, in order to prevent an unauthorized individual from establishing an identity with someone else's card by adjusting his fingers within the opening 2 until he finally succeeds in causing all of the masks to overlie the appropriate transparent portions on the identification card, a control mechanism is provided for controlling actuation of the photoelectric-sensing device comparing the pattern defined by the masks with the pattern defined on the identification card. This control mechanism is constructed so that the photoelectric-sensing means, as actuated thereby, takes a single reading at a predetermined small increment time during the identifying process. For effecting this mode of operation, contact members 26 are provided at the ends of two of the guides 10 for engagement by the individual's hand in the area defined by the root of his fingers when his fingers have been fully inserted into the opening 2 of the housing. As more fully described below, engagement with these contact members, sets the photoelectric-sensing device for taking a controlled reading.

Figure 7:
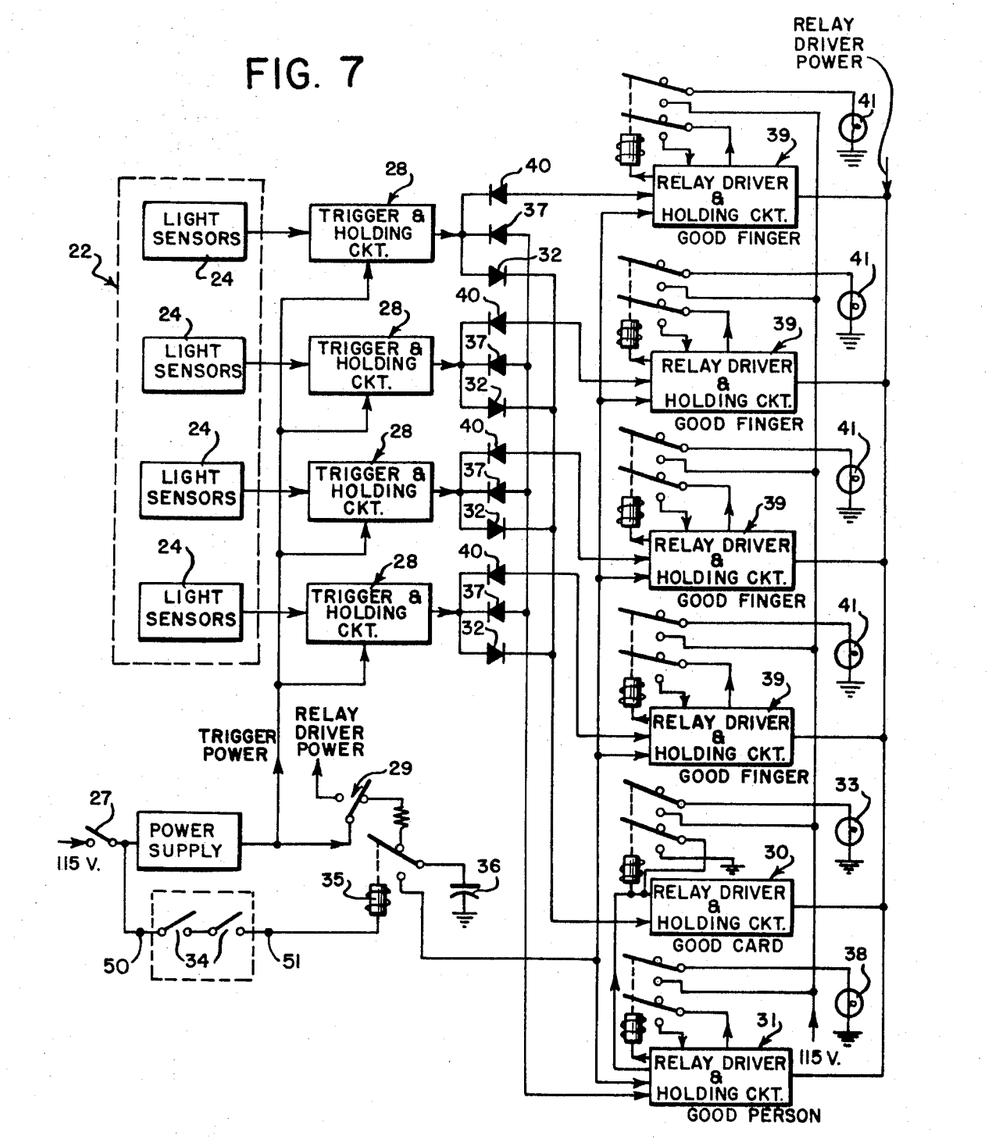
FIG. 7 is a schematic view showing the electrical circuitry of the identification system.

With reference to FIG. 7 where the electrical circuitry of the identification apparatus is shown, electrical power is supplied by closing of switch 27. Upon closing of this switch, it will be seen that power will be supplied only to a series of Schmitt trigger and holding circuits 28, each of which is controlled by one of the light sensors 24 of the photoelectric-sensing device 22. Upon full insertion of the identification card 21 within the recess 20, contact 25 is engaged to cause a switch 29, controlled thereby, to close. Closing of switch 29 applies power to a good card relay driver and holding circuit 30 and to a good person relay driver and holding circuit 31.

If the card inserted into the recess 20 is a proper card in that it has transparent portions permitting passage of light, light-sensing means 24 read the presence of light and cause the output of the trigger and holding circuits to assume a level of approximately 0 volts DC. This low level permits no current flow through the diodes 32 which are connected to the outputs of the circuits 28 and this, in turn, causes the good card relay driver and holding circuit 30 to energize and indicate through lighting of an indicator 33 that a proper card has been inserted. If, on the other hand, an improper card, that is one having no transparent portions, is inserted into the recess 20, any one of the light sensors 24, upon reading an absence of light causes the output of the associated trigger and holding circuits 28 to assume a level of approximately +12 volts DC. These light levels, or any combination of high light levels from either of the trigger and holding circuits 28, causes current to flow through the respective diode 32 to the good card relay driver and holding circuit and deenergize it. This, in turn, causes indicator 33 to be off thus indicating that an improper card has been inserted into the system.

In the situation where an improper card is sensed, subsequent operation of the system to indicate a proper identity of a person is prevented since the good person relay driver and holding circuit 31 which performs this function cannot be energized. This is so since this circuit's ground is completed only when the good card relay driver and holding circuit 30 is energized.

In the situation where a proper card has been inserted into the system and the good card relay driver and holding circuit 30 has been energized, the proper insertion of the hand into the opening 2 of the identifying apparatus will cause the engagement of the individual's hand with the contact members 26. These contact members are connected to a pair of microswitches 34 which are controlled thereby. Energization of both of the microswitches 34 applies power to a time delay relay 35. After a predetermined length of time, time delay relay 35 energizes; and upon energization, the charge stored by a capacitor 36 causes a voltage to be present at a point in the good person relay driver and holding circuit 31 thus allowing this circuit to be capable of receiving input signals.

The time delay set into the relay 35 provides an interval of time, for example, one second, in which the photoelectric-sensing device 22 is operative to sense the presence or absence of light passing through the identification card to thereby determine whether there is an identity or lack of identity between the pattern defined by the masks and the pattern defined by the transparent portions on the identification card. If an identity between these two patterns is established, the light sensors 24 detect an absence of light. This absence of light causes the output of the trigger and holding circuits 28 to assume a level of approximately +12 volts DC. This high level causes a condition of no current flow through the diodes 37, which are connected to the output of the circuits 28. Thus, there is no current flow to the good person relay and holding circuit 31. This lack of current flow causes this circuit 31 to energize. Energization of the good person relay driver and holding circuit 31 turns on an indicator 38 controlled thereby thus indicating that there is an identical correlation between the individual's finger characteristics and the particular card used in making the identification.

If any or all of the individual's fingers improperly position the respective masks of the finger sensing means with respect to the transparent portions on the identification card, the corresponding light sensors 24 detect a presence of light and the respective trigger and holding circuit output assumes a low level of approximately 0 volts DC. This low level causes current to flow from the good person relay driver and holding circuit 31 through diode 37 to ground via the trigger and holding circuit 28 thus disabling the good person relay driver and holding circuit.

Upon removal of the identification card from the system after an identification has been made, microswitch 29 returns to its normal position thus recharging capacitor 36 and removing power from the relay driver and holding circuits 30 and 31.

The description of the electrical circuitry of the identification system of the present invention has been made with reference to its construction for indicating simply the presence of a good card and the identity or lack of identity between the card and the person being identified. In some situations, as for analytical purposes, it may be desirable to provide a good finger relay driver and holding circuit for each of the four fingers inserted into the apparatus. In this way, a determination can be made as to which and how many of the individual's fingers caused the indicator 38 to show a lack of identity. Such an indication may be useful as for example where the person has injured one of his fingers after the identification card has been issued to him. If the injured finger is shown to be the sole cause of the improper identification through the good person indicator 38, this may, depending on the security requirements, be ignored.

In FIG. 7, the additional circuitry for indicating good or bad fingers is shown as including four good finger relay driver and holding circuits 39 which are connected to the outputs of the respective trigger and holding circuits 28 through the diodes 40. Each of the good finger relay and holding circuits have their own light indicators 41. The diodes 40 operate in the same manner as the diodes 37 for the good person relay driver and holding circuit 31; and simultaneously with such operation of the circuit 31, they control actuation of circuits 39 and the indicators 41. Thus, if a proper identification is sensed, all of the indicators 38 and 41 will be lighted, while if an improper identification is sensed, the indicator 38 and one or more of the indicators 41 will not be lighted.

Figures 8, 8A:
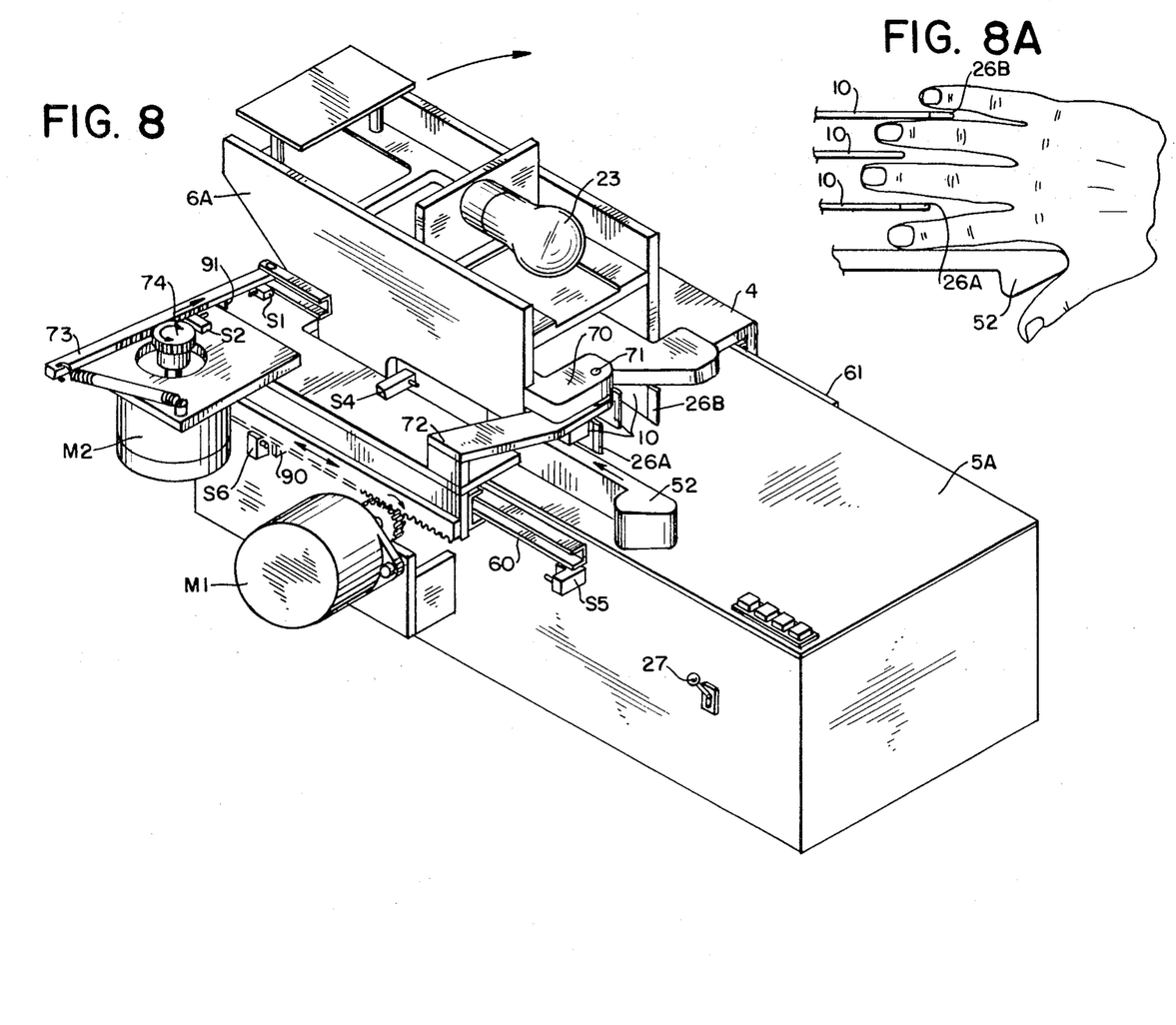
FIG. 8 is a front perspective view of identifying apparatus having power driven means for moving hand and finger measuring sensors to the prepositioned hand to be identified.
FIG. 8A is a fragmentary plan view of a hand placed in position for measurement on the apparatus shown in FIG. 8.

In accordance with a further embodiment of the invention illustrated in FIG. 8, the entire housing 6A, which supports all of the finger guide and sensing apparatus shown in FIGS. 1—4, is supported on base 5A for both forward and backward translation and rotation. In the operation of this embodiment, the hand to be identified is moved to a fixed position on the surface 5A and the finger sensing apparatus supported within 6A is moved into contact with the selected portions of the hand instead of moving the hand into contact with the machine as in the case of the first embodiment described above. As shown in FIG. 8A, the thumb and index finger of the hand to be identified are placed on opposite sides of triangular-shaped indexing actuator 52 and moved forward into contact with switch S6 which energizes translation drive motor M1. Housing 6A supported by slide rails 60, 61 is driven forward by rotation of pinion 62 engaged with rack 63 until the separator tip 26A comes into contact with the crotch between the index and middle finger (see FIG. 8A). Pressure contact of 26A with the finger crotch actuates a microswitch which stops motor M1 and at the same time turns on rotational drive motor M2. Housing 6A is pivotally supported for rotation by arm 70, pin 71 and lower support arm 72. Rotational drive is imparted to 6A by rack 73 and pinion 74 until sensor 26B is brought into pressure contact with the crotch between the little finger and ring finger. Whereupon a microswitch is actuated to stop motor M2.

Thus positioned, measurement of the fingers is made in the same way as described above in connection with the apparatus FIGS. 1—4.

Figure 9:
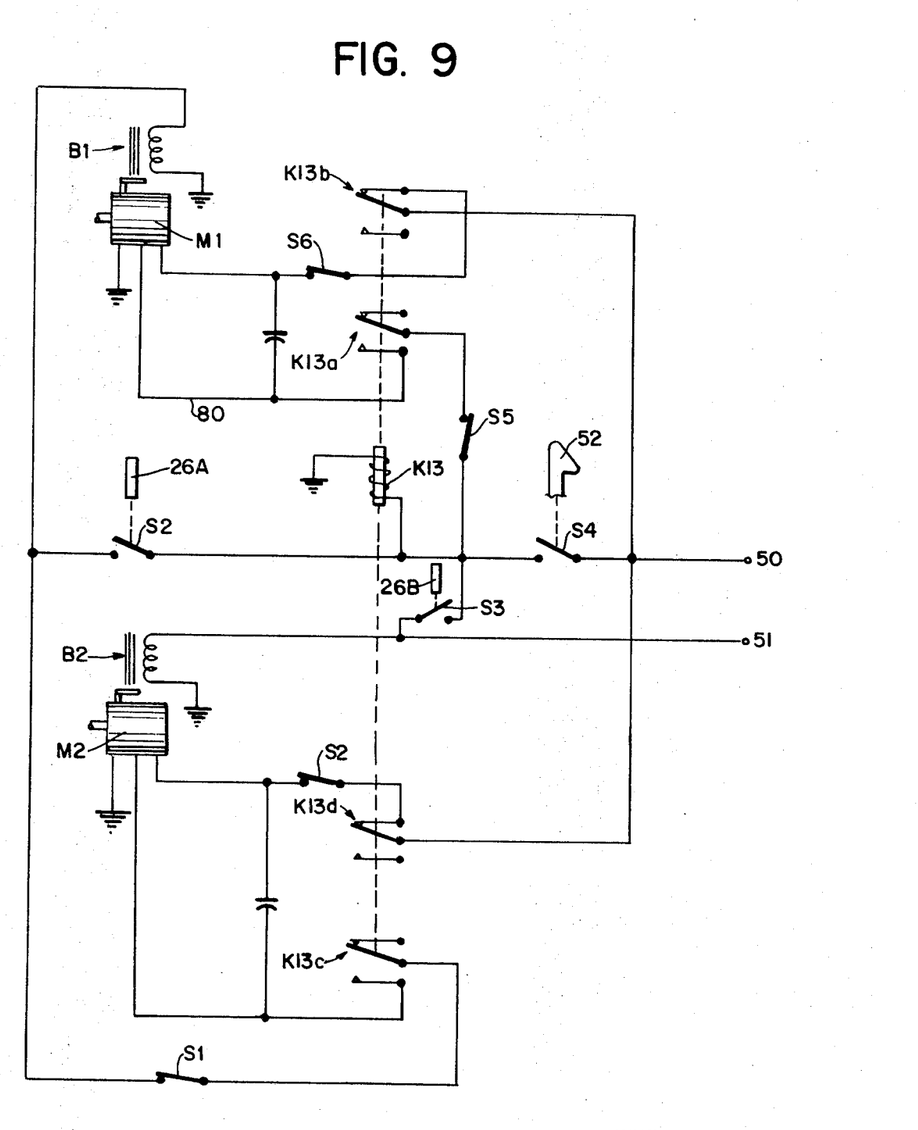
FIG. 9 is a schematic diagram of the control circuit for positioning the hand- and finger-sensing apparatus shown in FIG. 8.

A schematic diagram of the control circuit for translational and rotational drives shown in FIG. 8 is presented in FIG. 9. The circuit shown in FIG. 9 is connected as indicated to terminals 50, 51 in FIG. 7 as a replacement for switches 34. Power is applied to relay K13 by the closure of the normally open contacts of S4 actuated by the forward movement of 52 as described above. Actuation of relay K13 applies forward drive power to M1 via conductor 80 through normally closed contacts of overtravel microswitch S5 and the closing contacts K13a. Motor M1 continues to drive 6A in the direction of the hand to be identified until 26a is brought into pressure contact with the first finger root or crotch closing S2 and applying power to combination brake and clutch B1 to halt translational drive by M1.

At the same time drive power is applied to rotational drive motor M2 via the normally closed contacts of S1 and the closing of contacts K13c. Rotational drive is halted by the pressure contact of 26B with the second finger crotch causing closure of S3 and the application of power to brake-clutch B2.

Following measurement and removal of the hand from contact with 52, switch S4 is opened and relay K13 is deenergized. Motor M1 is then energized for reverse drive through contacts K13b and the normally closed contacts of S6 until S6 is actuated by contact with backstop tab 90 (see FIG. 8).

In like manner, motor M2 is energized for reverse drive through contacts K13d and the normally closed contacts of S2 until S2 is actuated by contact with stop tab 91 (see FIG. 8). Protection of motors M1 and M2 against translational and rotational overtravel is provided by stop switches S5 and S1.

Figure 10:
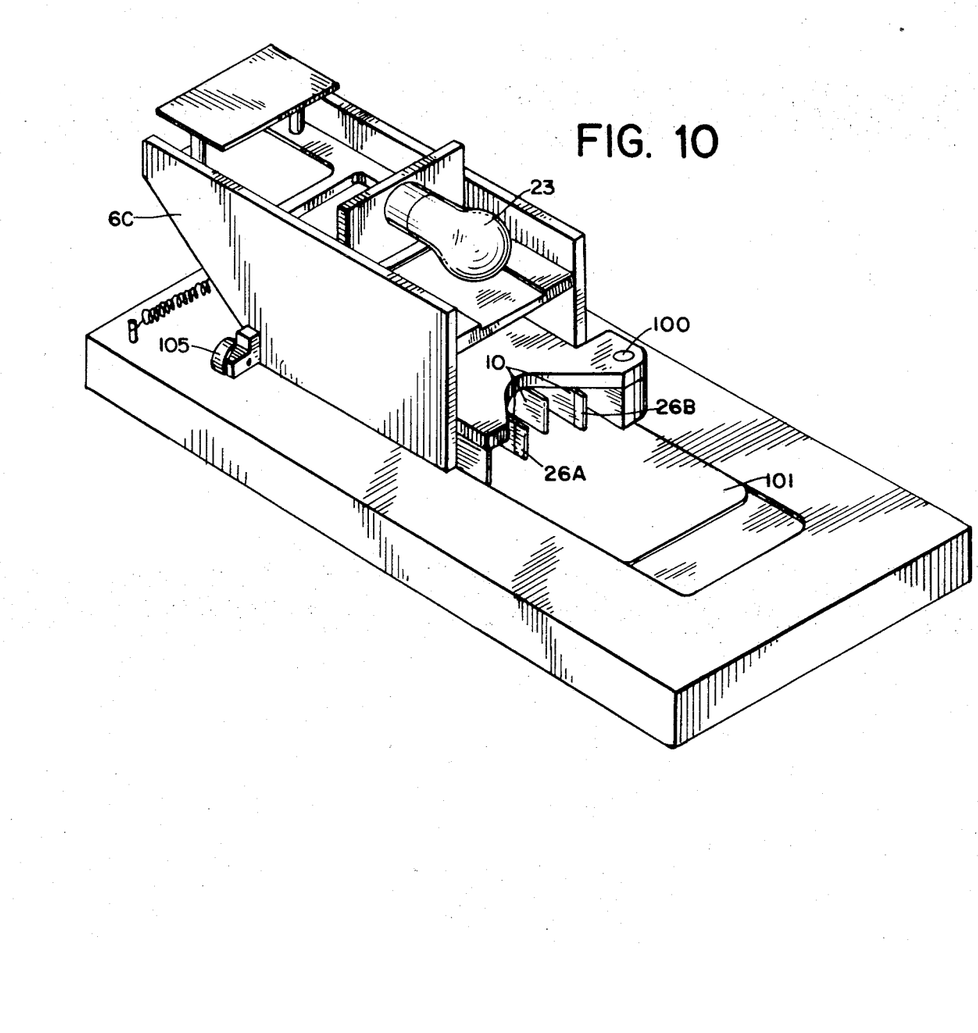
FIG. 10 is a front perspective view of identifying apparatus having a pivotally mounted sensor head provided to permit relative rotational movement of the hand- and finger-sensing apparatus with respect to translation of the hand to be identified.

In a third embodiment of the present invention, illustrated in FIG. 10, the housing 6C, including finger contact members 11—14, separators 10, crotch contact members 26, photosensors 24 and card 21, is pivotally supported on 5A by pin 100. In operation, the hand to be identified is placed on slide carrier 101 and moved forward until 26A comes into contact with the first finger crotch. Further forward movement of the hand causes 6C to be rotated clockwise against the spring loading provided by spring 104. Rotation of 6C assures that reliable contact is made between 26B and the second finger crotch. Since translational and rotational drives are not needed with the embodiment of FIG. 10, the control circuitry in FIG. 7 may be utilized.

The above description has been made with respect to the presently preferred embodiment of the present invention; however, it is to be understood that various changes may be made thereto without departing from the scope of the invention as set forth in the following claims. For example, the information contained on the identification card in the above-described embodiment may be contained in a lock mechanism constructed to receive the individual's fingers. Here, the lock would be provided with pins constructed for actuation by the individual's fingers upon insertion thereof into the lock. The pins would correspond to the rods 15 of the above-described embodiment of the invention and would be adapted to control movement of the lock tumblers when engaged by the individual's fingers.

The tumblers, in turn, would be constructed so that when positioned in a precalculated pattern related to the lengths of the individual's fingers, the lock would automatically open. With a lock of this type, opening will automatically occur upon there being an identity between the pattern defined by the lengths of the individual's fingers and the pattern defined by the tumblers upon setting thereof by the pins.

I claim:

1. In an identification system for identifying an individual, the combination comprising:
   a. first precalculated identifying means arranged in a first pattern related to certain dimensions of a plurality of an individual's fingers;
   b. finger-sensing means for sensing the same dimensions of the plurality of fingers of the individual to be identified as those dimensions represented by the first identifying means;
   c. second identifying means operable in response to said finger-sensing means to produce a second pattern related to said dimensions of the plurality of fingers sensed by said finger-sensing means; and
   d. means for determining the identity or lack of identity between said first and second patterns.

2. An identification system as set forth in claim 1 wherein: said first identifying means is arranged in a first pattern related to the separate lengths of a plurality of the individual's fingers.

3. An identification system as set forth in claim 2 wherein: said second pattern is related in a predetermined coded fashion to the separate lengths of the plurality of fingers sensed by said finger-sensing means for comparison with the first identifying means which is similarly coded.

4. In an identification system for identifying an individual, the combination comprising:
   a. a framework;
   b. means on said framework for receiving an identification card having thereon first precalculated identifying means arranged in a first pattern related to certain dimensions of a plurality of an individual's fingers;
   c. means on said framework for receiving the fingers of an individual to be identified;
   d. finger-sensing means for sensing the same dimensions of the plurality of fingers of the individual to be identified as those dimensions represented by the first identifying means on said identification card;
   e. second identifying means operable in response to said finger-sensing means to produce a second pattern related to said dimensions of the plurality of fingers sensed by said finger-sensing means; and
   f. means for determining the identity or lack of identity between said first and second patterns.

5. An identification system as set forth in claim 4 wherein:
   a. said framework includes a walled housing;
   b. the means for receiving said identification card includes a first opening in the walled housing;
   c. the means for receiving the fingers of said individual includes a second opening in the walled housing;
   d. said finger-sensing means and said second identifying means are disposed within said housing; and
   e. said means for determining the identity or lack of identity between said first and second patterns includes actuating means operable upon sensing of the positioning of the individual's fingers in a stationary position within said second opening for initiating a comparison of said first and second patterns.

6. An identification system as set forth in claim 5 further including:
   card-sensing means for determining the validity or nonvalidity of said identification card when positioned in a predetermined location within said first opening.

7. An identification system as set forth in claim 6 wherein:
   the means for determining the identity or lack of identity between said first and second patterns is connected to said card-sensing means for actuation only upon the sensing of a valid identification card.

8. An identification system as set forth in claim 7 wherein:
   said finger-sensing means is positioned in the path of movement of the individual's fingers being inserted into said second opening for engagement thereby to sense said outer dimensions.

9. In an identification system for identifying an individual, the combination comprising:
   a. a framework;
   b. means on said framework for receiving an identification card having thereon first identifying means arranged in a first pattern related to the separate lengths of a plurality of an individual's fingers;
   c. means on said framework for receiving the fingers of an individual to be identified;
   d. finger-sensing means for sensing the separate lengths of the same plurality of fingers of the individual to be identified as those represented by the first identifying means on said identification card;
   e. second identifying means operable in response to said finger-sensing means to produce a second pattern related to the separate lengths of the plurality of fingers sensed by said finger-sensing means; and
   f. means for determining the identity or lack of identity between said first and second patterns.

10. An identification system as set forth in claim 9 wherein:
    a. said framework includes a walled housing;
    b. the means for receiving said identification card includes a first opening in the walled housing;
    c. the means for receiving the fingers of said individual includes a second opening in the walled housing;
    d. said finger-sensing means and said second identifying means are disposed within said housing; and
    e. said means for determining the identity or lack of identity between said first and second patterns includes comparison means operable upon insertion of said individual's fingers a predetermined distance into said second opening and into a stationary position for comparing said first and second patterns.

11. An identification system as set forth in claim 10 wherein:
    a. said finger-sensing means includes:
       1. a plurality of contact members positioned in the path of movement of the individual's fingers being inserted into said second opening for engagement thereby and movement therewith as said fingers are moved into said stationary position, and
       2. biasing means normally urging each of said contact members outwardly toward said second opening;
    b. said second identifying means includes:
       1. a separate identifying member connected to each of said contact members for movement therewith, the identifying member associated with any particular finger sensed being mounted for movement along a path overlying the corresponding portion of the first identifying means on said card which defines the portion of said first pattern related to the length of said particular finger; and
    c. the means for determining the identity or lack of identity between said first and second patterns includes:
       1. comparison means for determining whether each of said identifying members of said second identifying means are in a predetermined position relative to the corresponding portion of the first pattern defined by said first identifying means on the identification card, said predetermined position being indicative of an identity between said first and second patterns.

12. In an identification system for identifying an individual comprising:
    a. a framework defining a walled housing;
    b. a first opening in said walled housing for receiving a partially transparent identification card having thereon first identifying means arranged in a first pattern related in a predetermined fashion to the separate lengths of a plurality of an individual's fingers, said first pattern being defined by the contrast between transparent and opaque portions of said card;
    c. a second opening in said walled housing for receiving the fingers of an individual to be identified;
    d. finger-sensing means for sensing the separate lengths of the same plurality of fingers of the individual to be identified as those represented by the first identifying means on said identification card;
    e. second identifying means having opaque portions and operable in response to said finger-sensing means to produce a second pattern related in said predetermined fashion to the separate lengths of the plurality of fingers sensed by said finger-sensing means, said second pattern being defined by the opaque portions of said second identifying means; and
    f. means for determining the identity or lack of identity between said first and second patterns, an identity being present when said second pattern as defined by the opaque portions of said second identifying means is in a predetermined position relative to the first pattern of said identification card as defined by the contrast between said transparent and opaque portions thereof.

13. An identification system as set forth in claim 12 wherein:
    said second pattern is related in a predetermined coded fashion to the separate lengths of the plurality of fingers sensed by said finger-sensing means for comparison with the first identifying means on said identification card which is similarly coded.

14. An identification system as set forth in claim 13 wherein:

said means for determining the identity or lack of identity between said first and second patterns includes actuating means operable upon sensing of the positioning of the individual's fingers in a stationary position within said second opening for initiating a comparison of said first and second patterns.

15. An identification system as set forth in claim 14 wherein said means for determining the identity or lack of identity between said first and second patterns includes:

a. a light source for projecting light from one side of said identification card and through the transparent portions of the first pattern thereon; and b. photoelectric-sensing means for receiving light passing through the transparent portions of the first pattern of said identification card, with an identity between said first and second patterns being present when the opaque portions of said second identifying means are in said predetermined position between said light source and said photoelectric-sensing means to effect a change between the absence and presence of light received by said photoelectric-sensing means.

16. An identification system as set forth in claim 15 wherein:

a. said finger-sensing means includes:
1. a plurality of contact members positioned in the path of movement of the individual's fingers being inserted into said second opening for engagement thereby and movement therewith as said fingers are moved into said stationary position, and
2. biasing means normally urging each of said contact members outwardly toward said second opening; and b. said second identifying means includes:
1. a separate identifying member connected to each of said contact members for movement therewith, the identifying member associated with any particular finger sensed being mounted for movement along a path overlying the corresponding portion of the first identifying means on said card which defines the portion of said first pattern related to the length of said particular finger.

17. An identification system as set forth in claim 16 wherein:

the separate identifying members of said second identifying means include opaque portions for blocking the light received by said photoelectric-sensing means when in said predetermined position between said light source and said photoelectric-sensing means indicating an identity between said first and second patterns.

18. An identification system as set forth in claim 17 further including:

card-sensing means for determining the validity or nonvalidity of said identification card when positioned in a predetermined location within said first opening.

19. An identification system as set forth in claim 18 wherein:

the means for determining the identity or lack of identity between said first and second patterns is connected to said card-sensing means for actuation only upon the sensing of a valid identification card.

20. Apparatus for identifying an individual, the combination comprising:

a. first precalculated identifying means arranged in a first pattern related to certain dimensions of a plurality of an individual's fingers;

b. means for supporting an individual's hand in a fixed predetermined position;

c. finger-sensing means for sensing the same dimensions of the plurality of fingers of the individual to be identified as those dimensions represented by the first identifying means;

d. second identifying means operable in response to said finger-sensing means to produce a second pattern related to said dimensions of the plurality of fingers sensed by said finger-sensing means;

e. mounting means for movably supporting said finger-sensing means relative to said hand; and f. means for determining the identity or lack of identity between said first and second patterns.

21. Apparatus in accordance with claim 20 wherein:

the support means for said finger-sensing means provides relative rotational movement between the finger sensors and said hand.

22. Apparatus in accordance with claim 20 wherein:

the support means for said finger-sensing means provides relative translational movement between the finger sensors and said hand.

23. Apparatus in accordance with claim 20 wherein:

the support means for said finger-sensing means provides both relative translational and rotational movement between the finger sensors and said hand.

24. Apparatus for identifying an individual, the combination comprising:

a. first precalculated identifying means arranged in a first pattern related to certain dimensions of a plurality of an individual's fingers;

b. means for supporting an individual's hand in a fixed predetermined position;

c. finger-sensing means for sensing the same dimensions of the plurality of fingers of the individual to be identified as those dimensions represented by the first identifying means including guide means for positioning the fingers of said hand with respect to said finger-sensing means;

d. second identifying means operable in response to said finger-sensing means to produce a second pattern related to said dimensions of the plurality of fingers sensed by said finger-sensing means;

e. mounting means for movably supporting said finger-sensing means relative to said hand; and f. means for determining the identity or lack of identity between said first and second patterns.

25. Apparatus in accordance with claim 24 wherein:

means are provided for moving the mounting for said finger-sensing means until at least one of said guide means is placed in contact with a finger crotch of said hand.

26. Apparatus in accordance with claim 24 wherein:

a. first means is provided for translating the mounting for said finger-sensing means until one of said guide means is placed in contact with a first finger crotch of said hand; and b. second means is provided for rotating the mounting for said finger-sensing means until a second of said guide means is placed in contact with a second finger crotch of said hand.

27. Apparatus for identifying an individual, the combination comprising:

a. first precalculated identifying means arranged in a first pattern related to certain dimensions of a plurality of an individual's fingers;

b. finger-sensing means for sensing the same dimensions of the plurality of fingers of the individual to be identified as those dimensions represented by the first identifying means;

c. second identifying means operable in response to said finger-sensing means to produce a second pattern related to said dimensions of the plurality of fingers sensed by said finger-sensing means;

d. mounting means for movably supporting said finger-sensing means relative to said hand;

e. slide means for movably supporting an individual's hand into contact with said finger-sensing means; and f. means for determining the identity or lack of identity between said first and second patterns.

28. In an identification system for identifying an individual, the combination comprising:

a. first precalculated identifying means consisting of a first data set related to certain dimensions of a plurality of an individual's fingers;
b. finger-sensing means for sensing the same dimensions of the plurality of fingers of the individual to be identified as those dimensions represented by the first identifying means;
c. second identifying means operable in response to said finger-sensing means to produce a second data set related to said dimensions of the plurality of fingers sensed by said finger-sensing means; and
d. means for determining the identity or lack of identity between said first and second data sets.

UNITED STATES PATENT OFFICE
CERTIFICATE OF CORRECTION

Patent No. 3,576,538　　　　　　　　　Dated April 27, 1971

Inventor(s)　　　Robert P. Miller

It is certified that error appears in the above-identified patent and that said Letters Patent are hereby corrected as shown below:

Column 1, line 6, "Ser. No. 728,242" should read -- Ser. No. 728,252 --. Column 5, line 56, "his fingers" should read -- the fingers --. Column 8, line 26, "spring 104" should read -- spring 105 --.

Signed and sealed this 7th day of December 1971.

(SEAL)
Attest:

EDWARD M. FLETCHER, JR.　　　　　　ROBERT GOTTSCHALK
Attesting Officer　　　　　　　　　　Acting Commissioner of Pat